United States Patent
Kuszneruk et al.

(10) Patent No.: US 10,378,677 B2
(45) Date of Patent: Aug. 13, 2019

(54) SHAPED MEMORY ALLOY (SMA) VALVE ASSEMBLY FOR CONTROLLING PRESSURIZED AIR SUPPLY TO AIR CELLS IN A VEHICLE SEAT

(71) Applicant: KONGSBERG AUTOMOTIVE SP. Z O.O., Pruszków (PL)

(72) Inventors: Piotr Kuszneruk, Warsaw (PL); Marcin Szrom, Warsaw (PL); Krystof Malek, Zwolen (PL); Tomasz Truszkowski, Warsaw (PL)

(73) Assignee: KONGSBERG AUTOMOTIVE SP. Z O. O., Pruszkow (PL)

( * ) Notice: Subject to any disclaimer, the term of this patent is extended or adjusted under 35 U.S.C. 154(b) by 180 days.

(21) Appl. No.: 15/669,242

(22) Filed: Aug. 4, 2017

(65) Prior Publication Data
US 2018/0038514 A1    Feb. 8, 2018

(30) Foreign Application Priority Data
Aug. 8, 2016    (EP) ..................................... 16183177

(51) Int. Cl.
*F16K 31/02* (2006.01)
*B60N 2/66* (2006.01)
(Continued)

(52) U.S. Cl.
CPC .......... *F16K 99/0038* (2013.01); *B60N 2/665* (2015.04); *B60N 2/914* (2018.02);
(Continued)

(58) Field of Classification Search
CPC ........ B60N 2/665; B60N 2/976; B60N 2/914; F16K 9/0038; F16K 31/002; F16K 31/025; F16K 99/0044; F16K 99/0048
(Continued)

(56) References Cited

U.S. PATENT DOCUMENTS 6,086,041 A * 7/2000 Gattuso ................ B60N 2/0232
251/129.06
2012/0143108 A1 * 6/2012 Bocsanyi .............. F15B 13/081
601/148
(Continued)

FOREIGN PATENT DOCUMENTS

DE    102005060217 A1    7/2006
EP        3037703 A1    6/2016
(Continued)

OTHER PUBLICATIONS

EP Search Report—Application No. 16183177.1, dated Feb. 7, 2017, 5 pages.

*Primary Examiner* — Kevin F Murphy
*Assistant Examiner* — Kelsey E Cary
(74) *Attorney, Agent, or Firm* — Cantor Colburn LLP

(57) ABSTRACT

A shaped memory alloy (SMA) valve assembly includes a plurality of SMA valves and a main printed circuit board carrying electronic components and conductors for operating the SMA valves. Each SMA valve includes a pressure chamber having a port. Each pressure chamber contains a valve element biased to a rest position in sealing abutment on a valve seat of the port, a SMA actuator, and an actuator printed circuit board for mounting and electrically connecting the SMA actuator. Each actuator printed circuit board portion is connected to the main printed circuit board portion by a bridge printed circuit board portion, and each pressure chamber has an opening to allow a respective bridge printed circuit board portion to extend therethrough. The opening is provided with a pocket filled with cured sealing glue to embed the bridge printed circuit board portion extending therethrough and to seal the opening of the pressure chamber.

18 Claims, 9 Drawing Sheets

(51) Int. Cl.
   *F16K 99/00* (2006.01)
   *F16K 31/00* (2006.01)
   *F16K 27/00* (2006.01)
   *B60N 2/90* (2018.01)

(52) U.S. Cl.
   CPC ............ *B60N 2/976* (2018.02); *F16K 27/003* (2013.01); *F16K 31/002* (2013.01); *F16K 31/025* (2013.01); *F16K 99/0044* (2013.01); *F16K 99/0048* (2013.01); *C08L 2201/12* (2013.01)

(58) Field of Classification Search
   USPC ................................ 137/883, 596.2; 251/11
   See application file for complete search history.

(56) References Cited

U.S. PATENT DOCUMENTS

2014/0265492 A1  9/2014  Larsen
2016/0018016 A1* 1/2016  Dankbaar .............. B60N 2/914
                                              251/129.01

FOREIGN PATENT DOCUMENTS

WO   WO2014135909 A1   12/2014
WO   WO2015086088 A1    6/2015

* cited by examiner

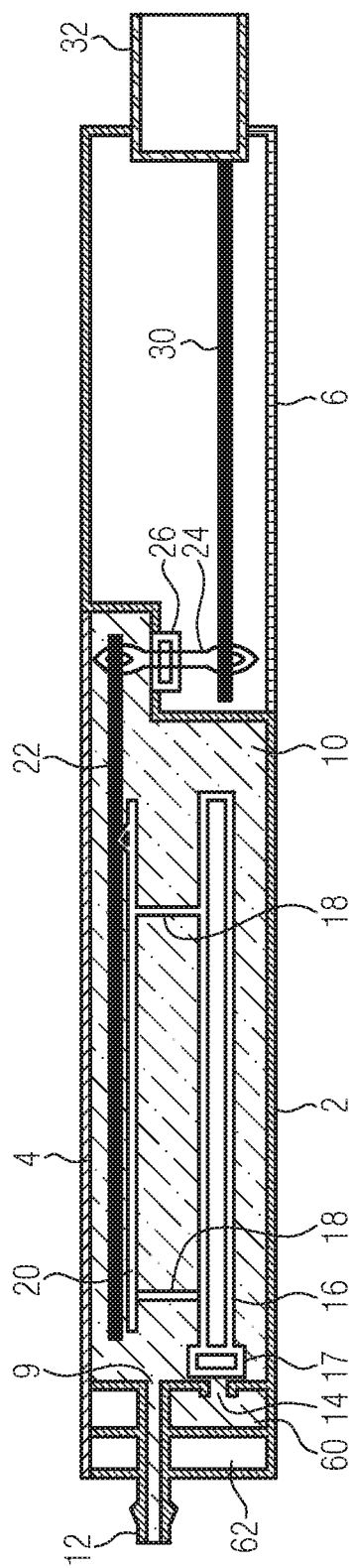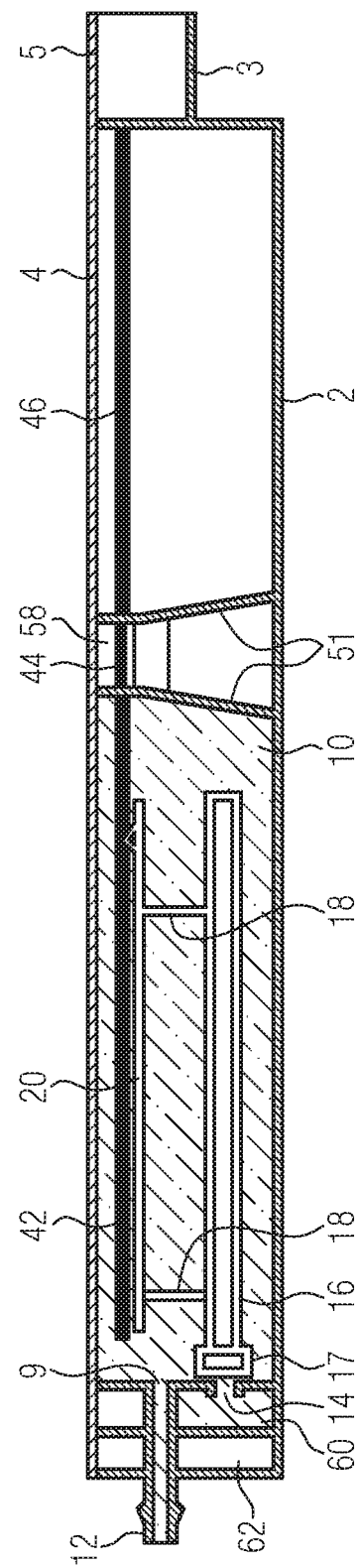

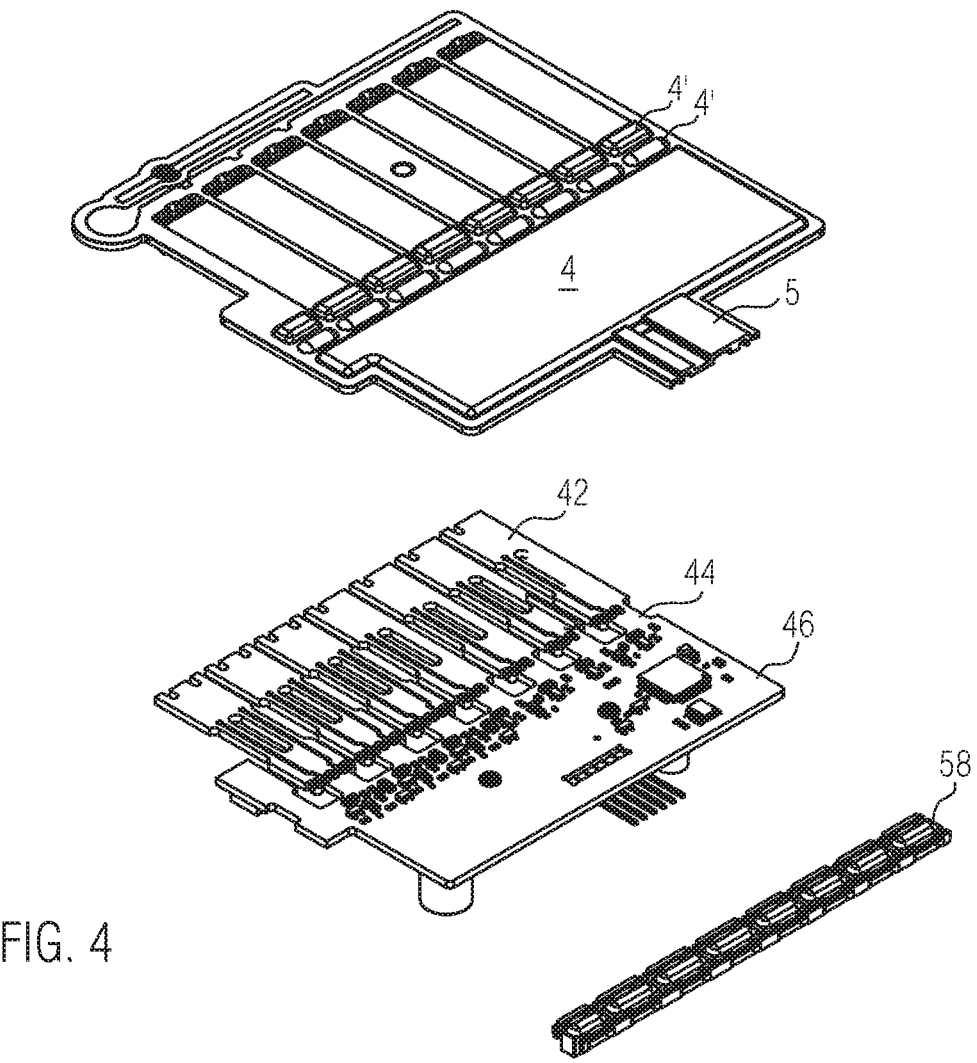
FIG. 4
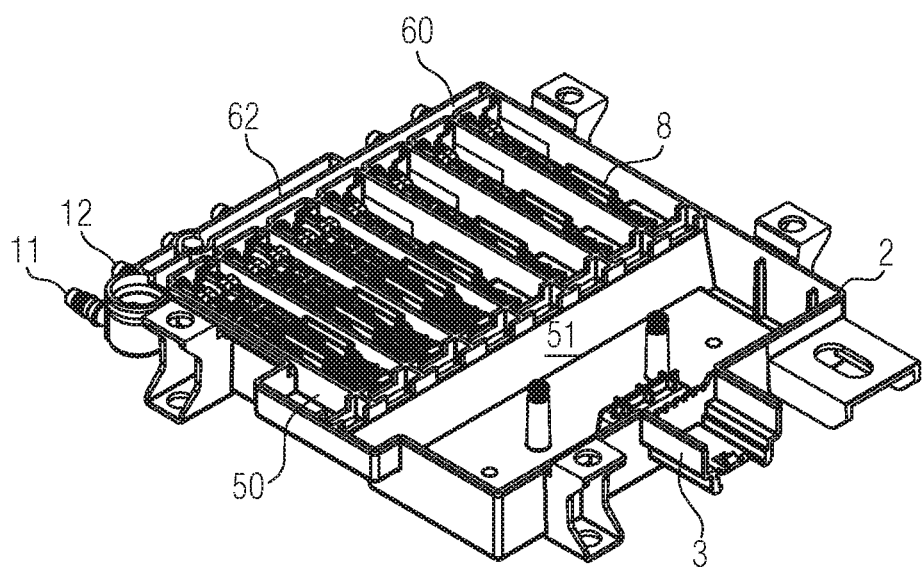

SHAPED MEMORY ALLOY (SMA) VALVE ASSEMBLY FOR CONTROLLING PRESSURIZED AIR SUPPLY TO AIR CELLS IN A VEHICLE SEAT

INTRODUCTION

The subject invention relates to a shaped memory alloy (SMA) valve assembly for controlling pressurized air supply to inflatable cells in a vehicle seat.

Drivers and passengers of motor vehicles, especially when driving long distances, often experience discomforts caused by long time static posture when seated in the vehicle seat. This is not only felt as being uncomfortable and causing for example back pain but may also lead to permanent impairment of health, in particular for professional drivers such as taxi, truck and bus drivers. To provide a remedy the automotive industries since some time offers vehicle seats with adjustable lumbar supports and bolsters and with integrated massage systems in the back seat which are based on pneumatic actuation. The lumbar supports and bolsters in seats are adjusted by inflating air cells by supplying pressurized air to the air cells. Pressurized air supply is stopped and the air cells are closed once the lumbar support and bolsters reached their desired inflation state. In massage systems series of air cells in the seat back are sequentially inflated and deflated to provide a massage effect.

Such a massage system for a vehicle seat is for example disclosed in U.S. Pat. No. 5,135,282 A. A series of air cells is disposed along a common supply line, the common supply line being supplied with pressurized air from a pump. In order to produce a propagating sequential inflation along that series of air cells starting from the first cell at the lower end of the seat back and continuing cell by cell to the last cell at the upper end of the seat, a number of controllable valves and a control unit are provided. In principle there is a controllable valve upstream of each air cell to permit to control the inflation, deflation of each cell individually, and further valves for controlling venting. Since the number of air cells in a massage system is considerable, the number of valves is correspondingly large. Similarly, in vehicle seats having adjustable lumbar supports and bolsters valves are present to open the air cells for inflation and to close the cells at the desired inflated state.

One type of controllable valve that is used in this field is the so called SMA valve, wherein SMA stands for "shape memory alloy". A SMA valve comprises a housing including a pressure chamber, a plunger as valve element in the pressure chamber, a spring urging the plunger to a closed position in a valve seat of a port to close the valve, and an actuator capable of acting on the plunger such that the actuator upon activation exerts a force on the plunger which moves the plunger away from the valve seat to an open position and keeps it there as long as the actuator remains activated. When the plunger is moved away from the valve seat pressurized air flows into the pressure chamber and from there to an outlet in communication with an air cell to be inflated. In the case of an SMA valve the actuator comprises a metal wire made of a shape memory alloy (SMA), which SMA wire is connected to the plunger and to a part fixed in the housing. Such shape memory alloy changes its microscopic structure at a threshold temperature such that the SMA wire shortens upon exceeding the threshold temperature. In particular, a SMA material at room temperature is in the state of a metal with martensitic properties, whereas the structure transitions at a threshold temperature of about 80° C. into an austenitic structure. Due to this transition a SMA wire shortens, wherein the shortening provides the force acting on the plunger to move it into the opened position. Actuation of the SMA valve is controlled by selectively supplying electrical power to the SMA wire to heat it up to the threshold temperature and to keep it at such temperature for the desired activation cycle, whereafter electrical power supply to the SMA wire is terminated to let the SMA wire cool down below the threshold temperature.

SUMMARY

In accordance with an aspect of an exemplary embodiment, a shaped memory alloy (SMA) valve assembly for controlling pressurized air supply to inflatable cells in a vehicle seat includes a housing containing a plurality of SMA valves and a main printed circuit board carrying electronic components and conductors for operating the SMA valves. Each SMA valve includes a pressure chamber having a port. Each pressure chamber contains a valve element biased to a rest position in sealing abutment on a valve seat of the port, a SMA actuator adapted to, when activated by supply of electrical energy, move the valve element away from the valve seat, and an actuator printed circuit board for mounting and electrically connecting the SMA actuator. A conductor arrangement electrically connects the actuator printed circuit boards inside of the pressure chambers to the main printed circuit board disposed in the housing outside the pressure chambers. The actuator printed circuit boards and the main printed circuit board are parts of a common printed circuit board carrying the conductor arrangement. Each actuator printed circuit board portion is connected to the main printed circuit board portion by a bridge printed circuit board portion, and each pressure chamber has an opening to allow a respective bridge printed circuit board portion to extend therethrough. The opening is provided with a pocket filled with cured sealing glue to embed the bridge printed circuit board portion extending therethrough and to seal the opening of the pressure chamber.

BRIEF DESCRIPTION OF THE DRAWINGS

The invention will now be described in further detail with reference to an exemplary embodiment shown in the drawings in which:

FIG. 1 shows a schematical cross-sectional view of a prior art shaped metal alloy (SMA) valve assembly;

FIG. 3 shows a schematical cross-sectional view of a SMA valve assembly as in FIG. 1 but for an embodiment according to the subject invention;

FIG. 4 shows an exploded view of the exemplary embodiment according to the invention;

DETAILED DESCRIPTION

Figure 2:
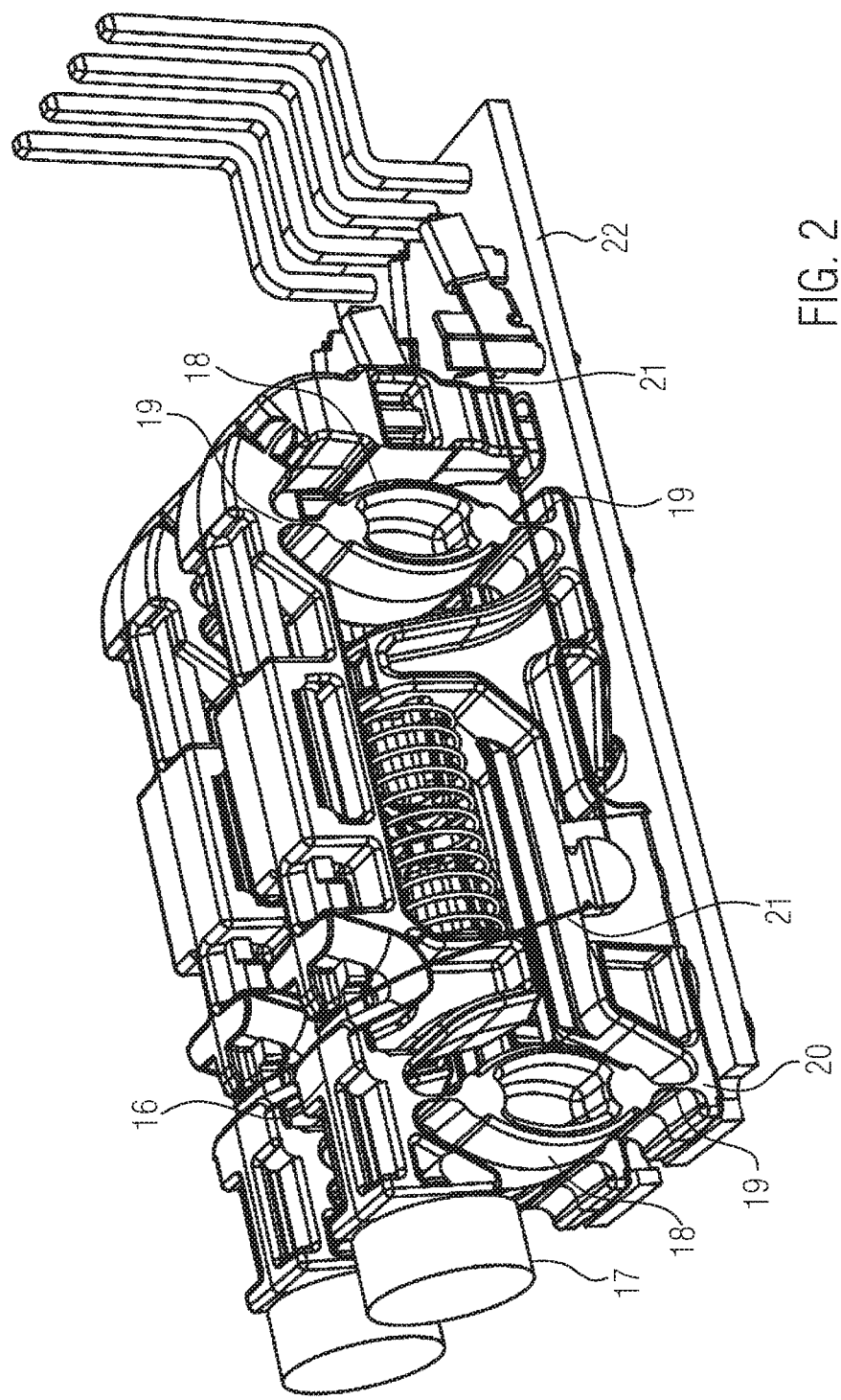
FIG. 2 shows a perspective view of two SMA actuators mounted in parallel on an actuator printed circuit board.

FIG. 1 shows a schematical cross-sectional view of a shaped metal alloy (SMA) valve arrangement according to the prior art as described in WO 2015/086088 A1. The SMA valve shown is in its closed position, i.e. a valve element 16 is with its sealing tip portion 17 in abutment on a valve seat of a port 14 of a pressure chamber 10 of the SMA valve. Pressurized air is supplied by a pump (not shown) to a pressurized air input manifold 60. If the SMA actuator is activated the valve element 16 is moved against a bias force so that the valve element 16 is moved with its sealing tip portion 17 away from the valve seat at port 14 such that pressurized air flows into pressure chamber 10 and further through a valve opening 9 into spigot 12 to which a tube (not shown) in communication with an air cell is connected. The area of the SMA valve in which pressurized air is present when the valve is open is hatched in FIG. 1.

The SMA actuator including a mounting bar 20 connected to the actuator printed circuit board 22, connecting links 18 and valve element 16 is shown in FIG. 1 schematically. A SMA actuator that can be used in connection with the subject invention is shown in FIG. 2 and is described in WO 2015/086088 A1 in more detail. FIG. 2 shows an arrangement of two SMA actuators mounted in parallel on an actuator printed circuit board 22. Each SMA actuator has a valve element 16 with a sealing tip portion 17. Valve element 16 is suspended by a parallelogram suspension. This suspension includes a mounting bar 20 connected to actuator printed circuit board 22. Two connecting links 18 are connected by flexure or solid state hinges 19 to mounting bar 20. The connecting links 18 are connected by further flexure hinges 19 to valve element 16. The valve element 16 and its parallelogram suspension can be an integrally formed component which can for example be made by injection moulding. The flexure hinges 19 are formed by weakened or reduced material thickness portions.

A compression spring is acting between a projection protruding from the mounting bar 20 and a projection from the valve element so that the spring urges the valve element 16 to its normally closed position in which the sealing tip portion 17 is in sealing abutment on a valve seat to close port 14 of the valve.

A SMA wire 21 is with both of its ends connected to members fixed on the actuator printed circuit board 22. From the first fixation point of the SMA wire near the right hand end portion of the actuator printed circuit board in FIG. 2, the SMA wire extends in a rectilinear fashion parallel to the actuator printed circuit board 22 to a deflection point around which it is routed, and extends from there towards the valve element 16. The SMA wire 21 is guided in a groove around valve element 16, and extends from there in a symmetrical fashion on the opposite side of the valve element 16 to an opposite fixation point at the end of the actuator printed circuit board 22. When the SMA actuator is activated, electrical current is supplied to the SMA wire 21 to heat it up. Upon reaching its threshold temperature SMA wire 21 shortens which results in a pulling force on valve element 16 pulling it to right hand side in the view of FIG. 2. As a result sealing tip portion 17 of valve element 16 is moved away from its associated valve seat to open the port of the SMA valve.

A schematical representation of the SMA valve assembly according to the invention is shown in cross-section in FIG. 3.

Figure 5:
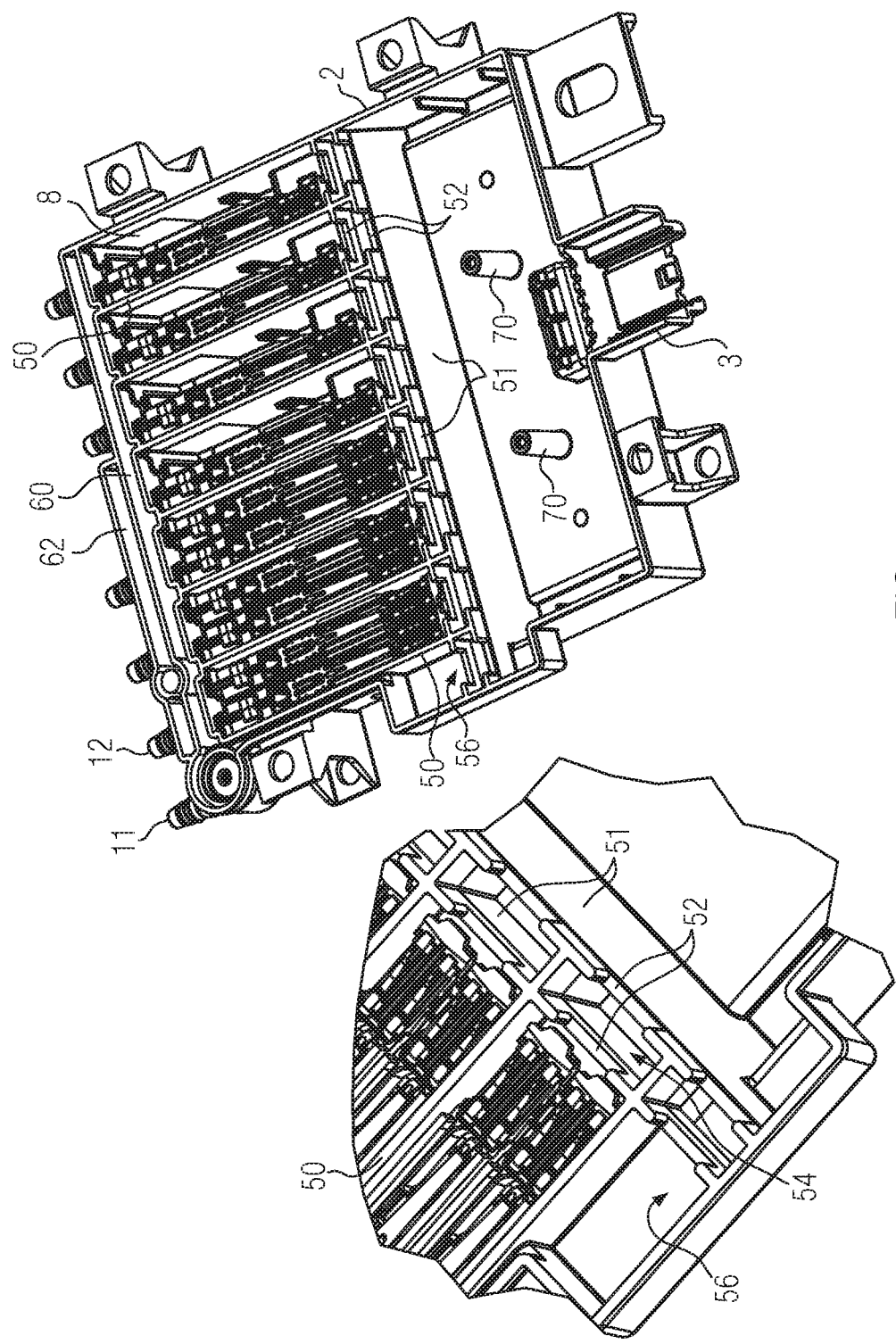
FIG. 5 shows a perspective view of the SMA valve assembly with a lid removed, and an enlarged detailed view of a portion thereof.
Figure 7:
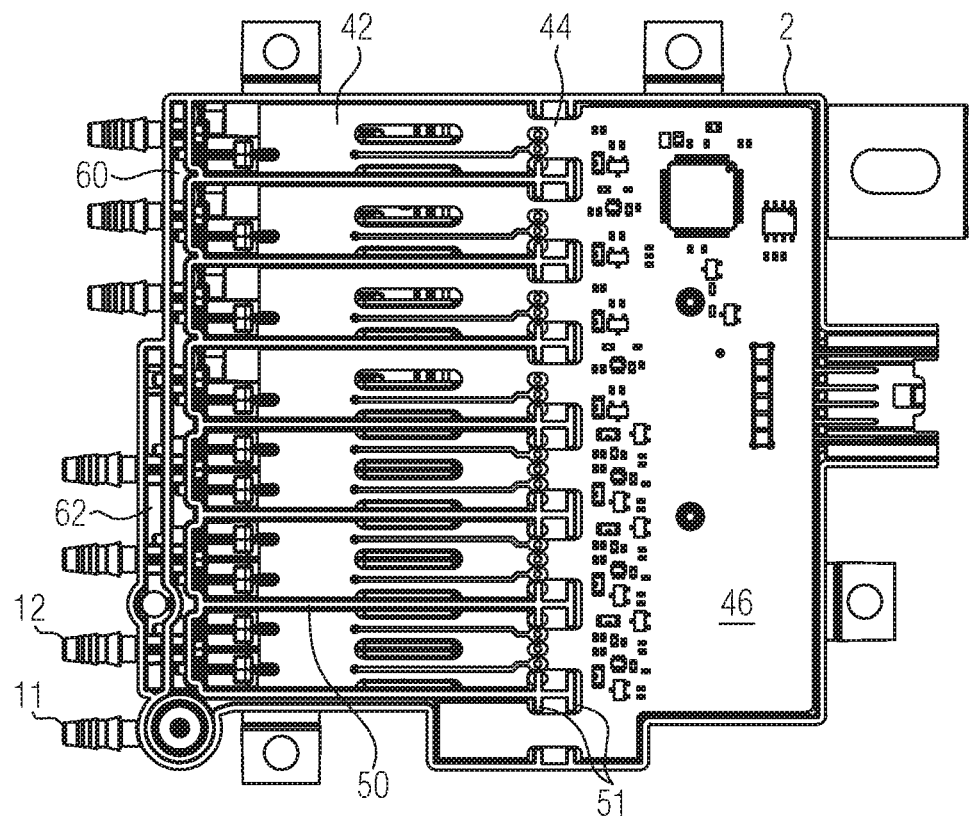
FIG. 7 shows a plan view of the exemplary embodiment with a lid removed.
Figure 8:
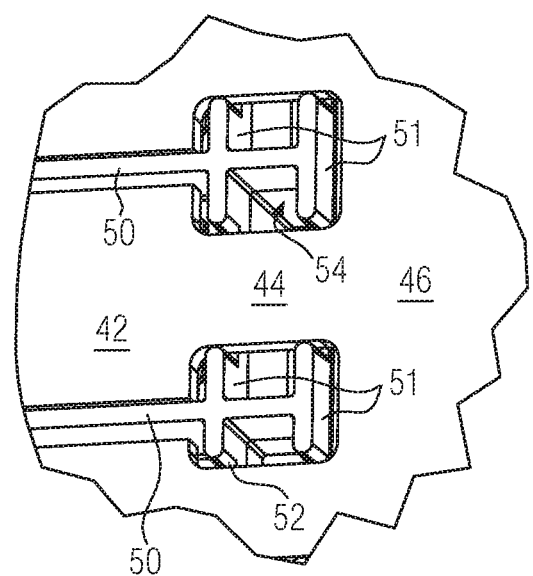
FIG. 8 shows an enlarged perspective view of a detail of FIG. 7.

FIG. 4 shows an exploded view of the SMA valve arrangement according to the exemplary embodiment. With reference also to FIGS. 5, 7, and 8 the SMA valve arrangement comprises a housing part 2 open at its upper side. In this housing part 2 seven parallel pressure chambers are formed by partition walls 50, 51 which are integrally formed inner walls in the housing part 2. The first three pressure chambers each contain two SMA actuators in parallel as shown in FIG. 2. Each of the SMA actuators of a pair of SMA actuators as in the first three pressure chambers can be activated independently, wherein one actuator is for opening the SMA valve to allow pressurized air to enter the pressure chamber and to flow through an opening to a spigot 12 for inflating an air cell. If the first SMA actuator is not activated (i.e. no pressurized air can enter the pressure chamber), the second SMA actuator can be activated to move the associated valve element away from a valve seat which is in fluid communication with a venting manifold 60 which is open to the ambient atmosphere which allows to individually vent the associated air cell for deflation.

The partition walls include seven parallel partition walls 50 extending in longitudinal direction of the housing part 2, and two parallel partition walls 51 transversely extending in the housing part 2, to define seven pressure chambers and a side chamber 56 (see FIG. 5) which is also in the pressurized area of the housing. A remaining interior space in the housing part 2 outside of the pressurized area is disposed between the transversely extending partition walls 51 and the opposite end wall of housing 2 which carries a lower socket portion 3. The number of parallel pressure chambers can of course be different in different embodiments.

In the SMA valve arrangement shown there are three SMA valves 8 having a single actuator only. This single actuator can be operated as described above to open the pressure chamber of the respective SMA valve by pulling the SMA valve element away from port 14 to open it with respect to the pressurized air input manifold 60 to let pressurized airflow through the pressure chamber to the respective spigot 12 to inflate an associated air cell. The SMA valve 8 having a single SMA actuator only cannot be operated to vent its associated air cell individually. In order to vent the air cells connected to the SMA valves having a single SMA actuator only, a common venting valve associated with the single SMA actuator valves has to be opened to vent simultaneously all air cells connected to the three SMA vales having a single SMA actuator only. This common venting valve is formed by a SMA valve having a single SMA actuator. This common SMA venting valve is shown in the arrangement of FIG. 4 in the center, i.e. three SMA valves with pairs of SMA actuators are disposed on the left hand side of this central SMA valve, and three SMA valves with the single SMA actuator are disposed on the right hand side of the central venting SMA valve.

The SMA valve arrangement of FIG. 4 further comprises a common printed circuit board 42, 44, 46, a lid 4, and cured sealing glue bodies 58 which will be described in more detail below.

Figure 6:
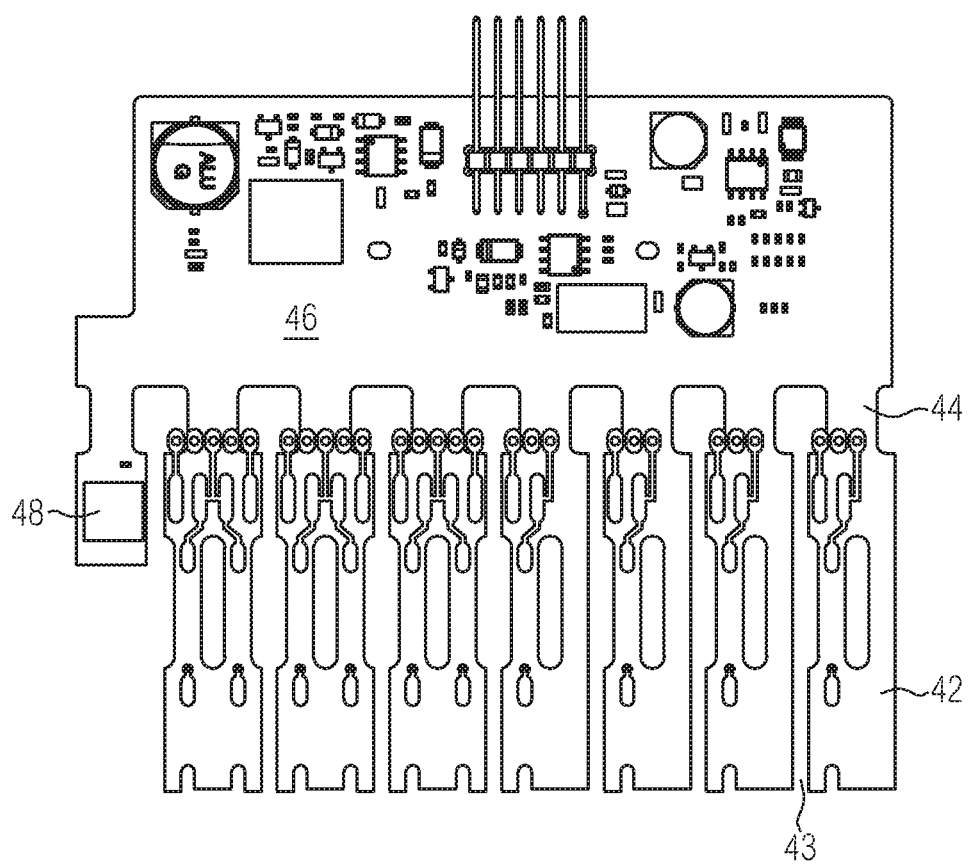
FIG. 6 shows a plan view of a common printed circuit board as used in the exemplary embodiment of the subject invention.

The exemplary common printed circuit board is shown in more detail in FIG. 6. It comprises seven parallel actuator printed circuit board portions 42 separated by gaps 43. Each of the actuator printed circuit board portions 42 is connected by a respective bridge printed circuit board portion 44 to a main printed circuit board portion 46. In the assembled state each actuator printed circuit board portion 42 is disposed in its associated pressure chamber formed by the partition walls 50, 51 in the housing part 2. The common printed circuit board carries a pressure sensor 48 which in the assembled state is located in the side chamber 56 (see FIG. 5) which as the pressure chambers belongs to the pressurized portion of the interior of the housing 2. There are further electronic components mounted on the common printed circuit board which are not further described here.

As can be seen in FIG. 5 each of the transversely extending partition walls 51 is provided with aligned openings or recesses 52 associated with each of the pressure chambers in the housing part 2. The openings 52 are formed by a cut or notch at the upper edge of the transversely extending partition walls 51. The width of the openings 52 is such that each of the openings can receive one of the bridge printed circuit board portions 44, as can best be seen in FIGS. 7 and 8.

FIG. 7 shows a plan view of the SMA valve assembly from above with the common printed circuit board inserted and without lid. As can be seen the partition walls 50, 51 extend through the gaps between adjacent actuator printed circuit board portions 42, wherein the upper edges of the partition walls 50, 51 project beyond the upper surface of the common printed circuit board.

The common printed circuit board is mounted to two mounting pins 70 (see FIG. 5) which project in the interior of the housing part 2 in the area outside of the pressure chambers.

With reference to FIGS. 5 and 8, the cavity 54 formed between the opposite transverse partition walls 52 is referred to as a pocket herein. This pocket 54 can be filled with viscose sealing glue in the area surrounding the bridge printed circuit portion extending through the openings 52 as will be described in more detail below in connection with FIG. 9.

When the common printed circuit board 42, 44, 46 is mounted on the mounting pins 70 a lid 4 can be mounted to close housing part 2. The upper edges of the partition walls 50 formed inside housing part 2 and the side walls of housing part 2 extend to the same level, i.e. lie in a common plane. Lid 4 is preferably joined with the partition walls 50, 51 and the side walls of housing part 2 by laser welding to form firm and air tight connections between the lid 4 and the partition walls 50, 51.

Figure 9:
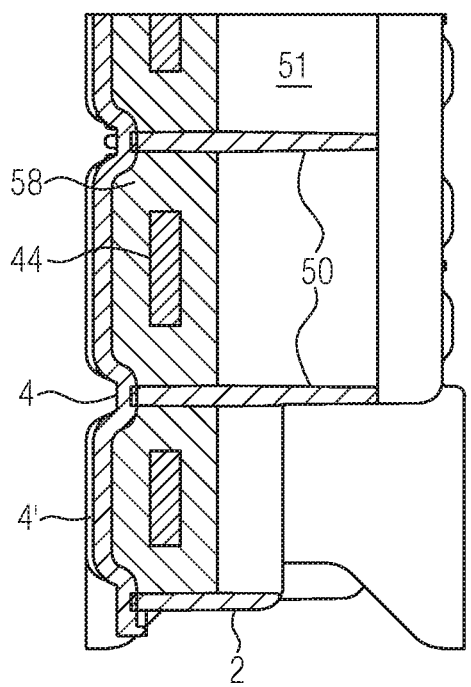
FIG. 9 shows a cross-sectional view taken along a plane IX-IX in FIG. 10.
Figure 10:
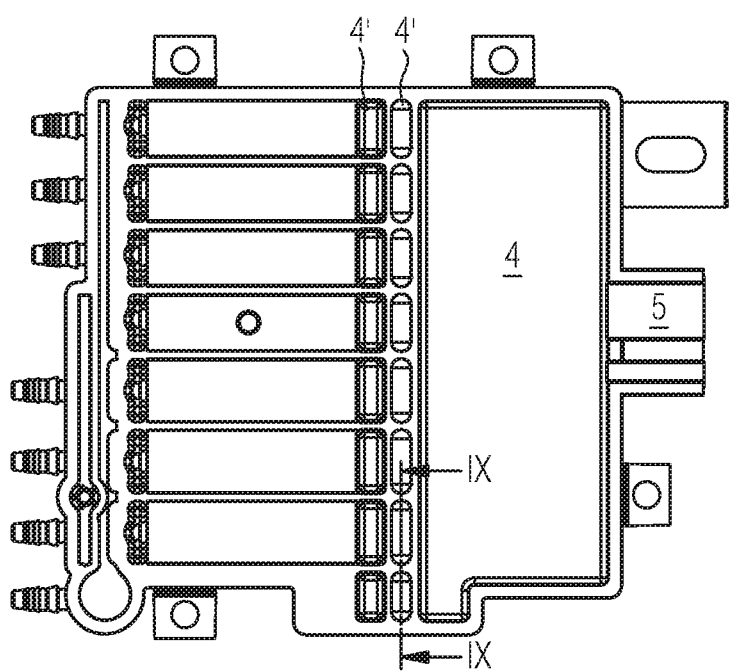
FIG. 10 shows a plan view of the exemplary SMA valve assembly from above.

In order to hermetically close the pressure chambers sealing glue is introduced in the space between the two transverse partition walls 51 in the area around the openings 52 of the partition walls such that the sealing glue flows around and completely embeds the bridge printed circuit board portions 44 around the area of openings 52 as is shown in the cross-sectional view of FIG. 9 which shows a cross-section taken along plane IX-IX in FIG. 10. The cured sealing glue bodies have reference numeral 58 in FIG. 9. The cross-sectional view of FIG. 9 is taken along plane IX-IX which extends parallel to and between the two transverse partition walls 51. The sealing glue is applied through a bottom opening of housing 2 after the lid 4 has been welded to the upper edges of the partition walls 51 and the side walls of housing 2.

In the following a method for filling the glue pockets for sealing the pressure chambers is described. When the common printed circuit board has been inserted, the lid is connected to the upper edges of the outer walls of the housing and to the upper edges of the partition walls by laser welding. Then the housing is turned upside down so that the lid forms the lower side. Through an opening in the housing wall opposite to the lid a sealing glue applicator is introduced from above and advanced until its dispensing end is close to the level of the common printed circuit board in the area between the two transverse partition walls 51. Then the sealing glue is dispensed such that the sealing glue flows around and completely embeds the bridge printed circuit board portion. In order to prevent that sealing glue flows through the openings to the adjacent pressure chamber or to the remaining interior of the housing the following may be done to confine the sealing glue essentially to the space between the two transverse partition walls 51. As sealing glue a UV curable sealing glue is utilized, and the lid is made of UV transparent material. Before the sealing glue is dispensed in the space between the two transverse partition walls 51 a mask is applied to the outer surface of the lid, which mask covers the space between two transverse partition walls 51 but does not extend beyond the surfaces of the partition walls facing the pressure chambers and facing the remaining interior of the housing, respectively, but leaves these outer surfaces free so that UV radiation may pass along the outer surfaces of the partition walls facing away from each other. When sealing glue starts to be dispensed UV radiation is directed essentially perpendicular to the lid so that the interior of the housing beyond the gap between transverse partition walls, which gap is covered by the mask, is exposed to UV radiation. Any sealing glue emerging from openings 52 in the transverse partition walls to the pressure chambers or to the remaining interior of the house, respectively, is immediately cured by impinging UV radiation and thus forms a plug in the opening. The space between the two transverse partition walls 51 is still covered by the mask so that the sealing agent there is free to flow around the bridge printed circuit portion to completely fill the sealing glue pocket. Eventually the mask is removed while exposure to UV radiation is continued so that sealing glue of the filled glue pocket is completely cured. The process may be conducted for each glue pocket individually or for several adjacent glue pockets at the same time.

Of course, there are other ways to prevent sealing glue from passing the openings when the glue pockets are being filled with sealing glue. For example, an adhesive tape or a rapidly curing sealing agent could first be applied to the outer walls of the transversely extending partition walls to form plugs in the openings. When the plugs are in place the sealing agent for filling and sealing the glue pockets can be filled in and cure.

Figure 11:
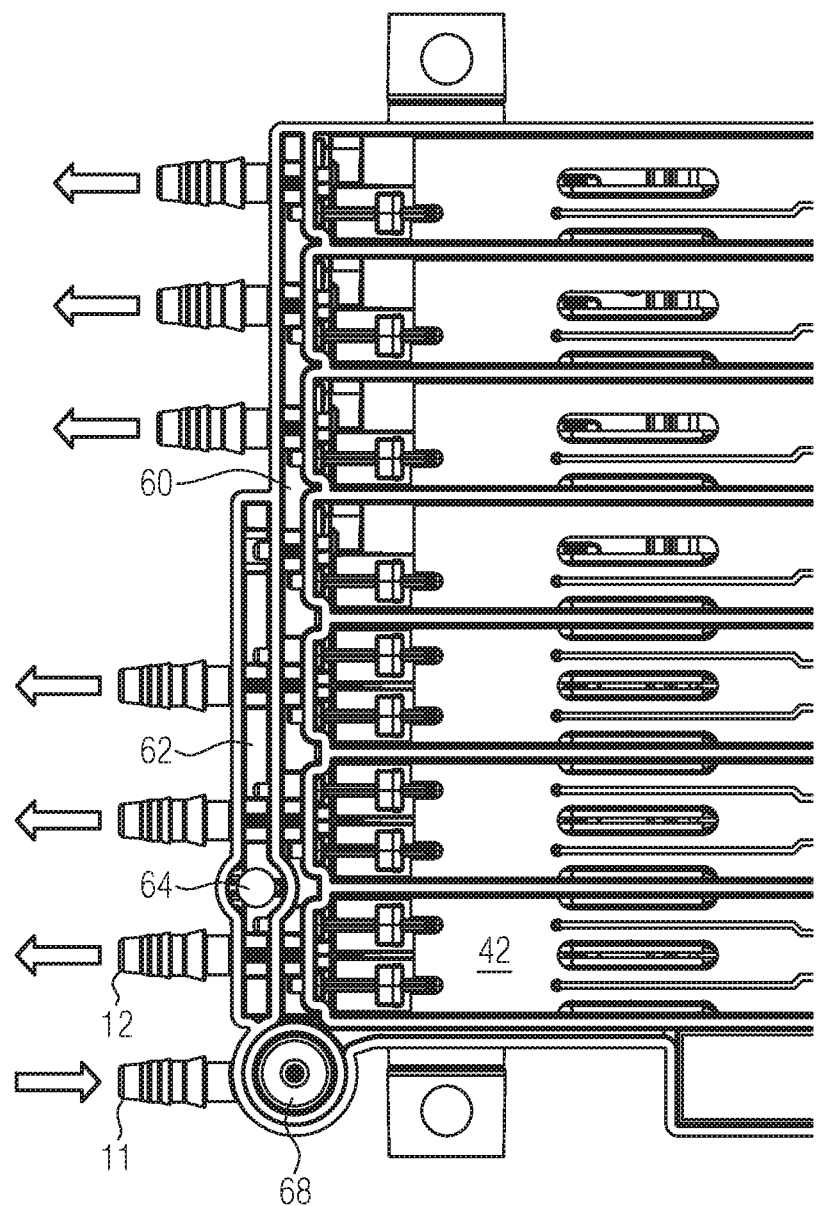
FIG. 11 shows a cross-sectional view of the SMA valve assembly taken in a plane slightly below common printed circuit board.
Figure 12:
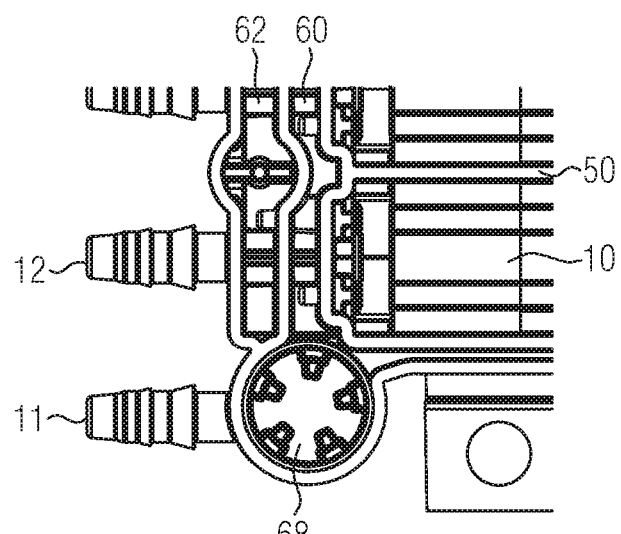
FIG. 12 shows a detail of the exemplary SMA valve assembly in a plane view from above, wherein the lid and the SMA actuators are omitted.
Figure 13:
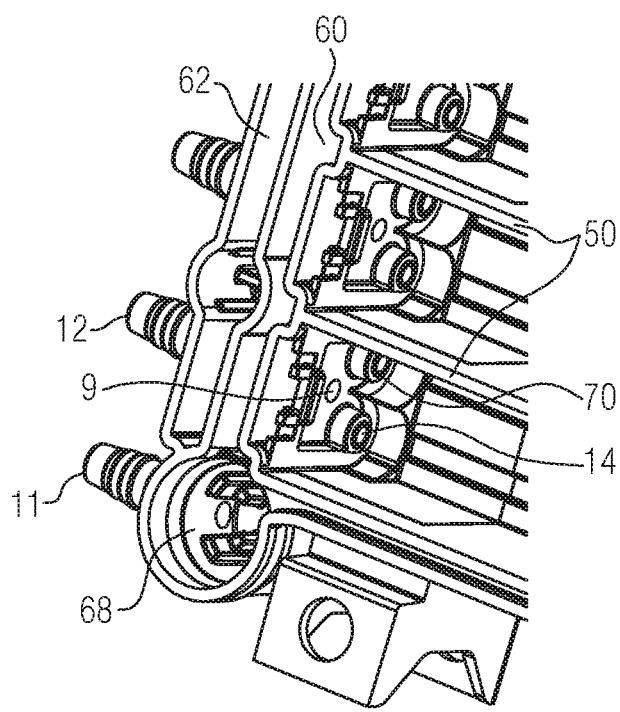
FIG. 13 shows a perspective view of a detail of the exemplary SMA valve assembly, wherein lid and SMA actuators are omitted.

The pressurized air flow in the SMA valve assembly will now be described with reference to FIGS. 11 to 13. Pressurized air is supplied by a pump (not shown) and a hose which is connected to input spigot 11 which is in fluid communication with a cylindrical input chamber 68. Input chamber 68 is in fluid communication with pressurized air input manifold 60 in front of the pressure chambers. Each pressure chamber has a port 14 (see FIG. 13) which is normally closed by the associated SMA actuator (not shown in FIG. 13). When the SMA actuator is activated and moved the associated valve element away from the valve seat at port 14 pressurized air flows from the input manifold 60 through port 14 into the pressure chamber, and from there through an opening 9 (see FIG. 13) to spigot 12 to inflate a connected air cell. When the SMA actuator closes port 14 of the SMA valve again the associated air cell remains inflated until a parallel SMA actuator is activated and opens venting port 70 which is in fluid communication with venting manifold 62 to deflate the associated air cell again.

As has already been explained above, the SMA valves having a single SMA actuator only cannot be operated to vent the connected air cells individually, but have a common SMA venting valve which, when opened, connects all associated SMA valves with a single SMA actuator simultaneously to venting manifold 62.

As can be seen for example from FIG. 4 the lid 4 has a lid socket portion 5 projecting therefrom which may be integrally formed with lid 4. Housing part 2 has a complementary housing socket portion 3. When the lid 4 has been connected to housing part 2 lid socket portion 5 and housing socket portion 3 together form a socket for receiving a connector plug for connecting it to the main printed circuit board portion 46. In this manner the socket for receiving the connector is automatically formed when housing part 2 and lid 4 are connected, so that no extra socket component needs to be provided and connected to the housing as in the prior art.

According to the exemplary embodiments the actuator printed circuit boards and the main printed circuit board form a common printed circuit board carrying the conductor arrangement, wherein each actuator printed circuit board portion is connected to the main printed circuit board portion by a bridge printed circuit board portion. Each pressure chamber has an opening to allow a respective bridge printed circuit board portion to extend therethrough. This opening is covered by a pocket filled with cured sealing agent to embed the bridge printed circuit board portion extending therethrough and to seal the opening of the pressure chamber.

It is evident that the design and assembly of such SMA valve arrangement is considerably simplified since only a single common printed circuit board is present and can be mounted in the housing in a single step through an open side of the housing such that the actuator printed circuit boards are disposed in the pressure chambers and that the main printed circuit board is disposed in the remaining interior of the housing outside of the pressure chambers, wherein the actuator printed circuit board portions are connected by bridge printed circuit board portions to the main printed circuit board portion of the common printed circuit board. After inserting the common printed circuit board, in a preferred embodiment, a single lid is mounted to the open side of the housing, for example by laser welding, to close and seal the pressure chambers and to close the remaining part of the interior of the housing. In this embodiment, the lid is connected to the side and end walls of the housing and to inner partition walls that define the pressure chambers so that the pressure chambers are eventually closed by the lid. Thereafter the openings of the pressure chambers through which the bridge printed circuit board portions extend are sealed by filling pockets surrounding the openings with sealing agent that cures to embed the printed circuit board portions extending therethrough and to seal the openings of the pressure chambers. The sealing glue can be introduced through an opening in the housing wall opposite to the lid.

Therefore, there is no need for individually inserting a plurality of actuator printed circuit boards, and no need to mechanically connect the actuator printed circuit boards to the main printed circuit board, and no need to electrically connect the actuator printed circuit boards to the main printed circuit board. Instead a common printed circuit board is provided which already includes the connections between actuator printed circuit board portions and the main printed circuit board, and which is provided with conducting paths electrically connecting the actuator printed circuit boards and the main printed circuit board.

As will be appreciated the SMA valve assembly according to the subject invention is of considerably simpler design as the prior art SMA valve assembly which is schematically shown in FIG. 1. In particular, there are much less individual component since only a single common printed circuit board has to be provided and mounted, compared to a plurality of individual actuator printed circuit boards and a separate main printed circuit board as in the prior art. Furthermore, no separate connectors are needed to connect the plurality of actuator printed circuit boards mechanically and electrically to the main printed circuit board. This also considerably simplifies the assembly process since only a single common printed circuit

What is claimed is:

1. A shaped memory alloy (SMA) valve assembly for controlling pressurized air supply to inflatable cells in a vehicle seat, comprising:
a housing containing a plurality of SMA valves and a main printed circuit board carrying electronic components and conductors for operating the SMA valves, each SMA valve comprising:
a pressure chamber having a port, each pressure chamber containing: a valve element biased to a rest position in sealing abutment on a valve seat of the port, a SMA actuator adapted to, when activated by supply of electrical energy, move the valve element away from the valve seat, and an actuator printed circuit board for mounting and electrically connecting the SMA actuator;
a conductor arrangement electrically connecting the actuator printed circuit boards inside of the pressure chambers to the main printed circuit board disposed in the housing outside the pressure chambers;
wherein the actuator printed circuit boards and the main printed circuit board form part of a common printed circuit board carrying the conductor arrangement, wherein each actuator printed circuit board portion is connected to the main printed circuit board portion by a bridge printed circuit board portion, and in that each pressure chamber has an opening to allow a respective bridge printed circuit board portion to extend therethrough, which opening is provided with a pocket filled with cured sealing glue to embed the bridge printed circuit board portion extending therethrough and to seal the opening of the pressure chamber.

2. The SMA valve assembly according to claim 1, wherein the housing comprises two housing parts joined in a plane parallel to a plane of the common printed circuit board, in that the pressure chambers are defined by partition walls integrally formed inside of the housing parts, and in that the opening of each pressure chamber is defined by a recess in a partition wall separating the pressure chamber from the remaining interior of the housing, wherein each recess has a width larger than the width of the associated bridge printed circuit board portion, and wherein the associated pocket is arranged adjacent to the recess such that, when filled with cured sealing glue, the sealing glue fully covers and seals the opening area of the recess.

3. The SMA valve assembly according to claim 2, wherein there are parallel partition walls longitudinally extending in the housing which separate adjacent pressure chambers, and at least one transversely extending partition wall separating the pressure chambers from the remaining interior of the housing.

4. The SMA valve assembly according to claim 3, wherein there are two parallel transversely extending partition walls, both having aligned recesses as openings for receiving a bridge printed circuit board portion, wherein the space between the two transversely extending partition walls in the area around the openings defines the sealing glue pockets.

5. The SMA valve assembly according to claim 2, wherein the two housing parts comprise a housing part open on one side and including the integrally formed partition walls for defining the plurality of pressure chambers, and a lid, wherein the lid is connected to the housing side walls and partition walls to define the plurality of pressure chambers and the remaining interior of the housing.

6. The SMA valve assembly according to claim 5, wherein the upper edges of the partition walls project from gaps between adjacent bridge printed circuit board portions.

7. The SMA valve assembly according to claim 6, wherein the housing part and the lid are made of plastics, and that the lid is connected to the upper edges of housing side walls and of the partition walls by welding.

8. The SMA valve assembly according claim 5, wherein the lid is formed with outwardly extending dimples which are arranged such that, when the lid is mounted to the housing part, each of the dimples is disposed next to the bridge printed circuit board portion at the opening of the partition wall receiving the bridge printed circuit board portion and forms part of the pocket for receiving curable sealing agent.

9. The SMA valve assembly according to claim 5, wherein the housing part and the lid are provided at one end with integrally formed socket portions which, when the lid is mounted to the housing part, together form a socket for receiving a connector to connect it to the common printed circuit board.

10. A method of assembling a shaped memory alloy (SMA) valve assembly, comprising:
providing a housing containing a plurality of SMA valves and a main printed circuit board carrying electronic components and conductors for operating the SMA valves; each SMA valve comprising a pressure chamber having a port, each pressure chamber containing: a valve element biased to a rest position in sealing abutment on a valve seat of the port, a SMA actuator adapted to, when activated by supply of electrical energy, move the valve element away from the valve seat, and an actuator printed circuit board for mounting and electrically connecting the SMA actuator;
providing a conductor arrangement electrically connecting the actuator printed circuit boards inside of the pressure chambers to the main printed circuit board disposed in the housing outside the pressure chambers;
wherein the actuator printed circuit boards and the main printed circuit board are provided by inserting an integral common printed circuit board carrying the conductor arrangement and including a plurality of actuator printed circuit board portions and a main printed circuit board portion, wherein each actuator printed circuit board portion is connected to the main printed circuit board portion by a bridge printed circuit board portion, and in that each pressure chamber is provided with an opening to allow a respective bridge printed circuit board portion to extend therethrough, which opening is provided with a pocket, and in that each pocket is filled with curable sealing glue to embed the bridge printed circuit board portion extending therethrough and to seal the opening of the pressure chamber by cured sealing glue.

11. The method according to claim 10, wherein the housing is provided by providing a housing part open on one side and a lid for closing the open side, wherein the housing part is formed by injection moulding and includes partition walls integrally formed inside of the housing part for defining the pressure chambers, wherein there are parallel partition walls longitudinally extending in the housing which separate adjacent pressure chambers, and at least one transversely extending partition wall separating the pressure chambers from the remaining interior of the housing, wherein the openings of the pressure chambers for receiving bridge printed circuit board portions are formed by recesses in the upper edge of the at least one transversely extending partition wall.

12. The method according to claim 11, wherein the SMA actuators are mounted to and electrically connected to actuator printed circuit board portions, and the conductor arrangement is provided on the common printed circuit board before the common printed circuit board is inserted such that each actuator printed circuit board portion is disposed within a pressure chamber of the housing part, each bridge printed circuit board portion is disposed within an opening of the associated pressure chamber, and that the main printed circuit portion is disposed in the interior of the housing part outside of the pressure chambers.

13. The method according to claim 11, wherein the housing part is formed with two transversely extending partition walls parallel to each other, each including aligned recesses in their upper edges to form the openings for receiving bridge printed circuit board portions.

14. The method according to claim 13, wherein the housing part is closed by welding the lid to the upper edges of sidewalls of the housing part and to the upper edges of the partition walls.

15. The method according to claim 14, wherein the housing part with the connected lid is turned upside down so that the lid forms the bottom surface of the housing, a sealing glue applicator is introduced from above through an opening in the housing part to extend into the housing to a pocket, and sealing glue is dispensed such that it flows around the bridge printed circuit board portion in the pocket formed between the two transversely extending partition walls, and that the sealing glue is cured to close and seal the opening of the pressure chamber, wherein the opening of each pressure chamber is closed and sealed in this manner.

16. The method according to claim 13, wherein curing of the sealing glue is performed by applying UV radiation to a UV curable sealing glue, wherein the UV radiation is applied through the lid in the region of the pockets by directing a UV beam onto the lid, which lid is at least partially transparent for UV radiation.

17. The method according to claim 16, wherein UV radiation is applied in a first step to regions adjacent to a pocket, when sealing glue starts to be dispended into the pocket such that any sealing glue that flows into an opening of the partition walls is immediately cured when it reaches the end of an opening opposite to the pocket to form a plug there, whereafter, once a pocket is completely filled with sealing glue, UV radiation is applied in a second step to the region between the two transversely extending partition walls.

18. The method according to claim 17, wherein the first step of applying UV radiation a mask is placed on the lid which covers the gap between the two transversely extending partition walls but leaves regions adjacent thereto free for exposure, whereas the mask is removed for the second step of applying UV radiation.

\* \* \* \* \*